(12) United States Patent
Fu et al.

(10) Patent No.: US 10,615,701 B2
(45) Date of Patent: Apr. 7, 2020

(54) HYBRID RESONANT CONVERTER

(71) Applicant: Futurewei Technologies, Inc., Plano, TX (US)

(72) Inventors: Dianbo Fu, Frisco, TX (US); Heping Dai, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 16/007,273

(22) Filed: Jun. 13, 2018

(65) Prior Publication Data
US 2019/0020280 A1 Jan. 17, 2019

Related U.S. Application Data

(60) Provisional application No. 62/532,789, filed on Jul. 14, 2017.

(51) Int. Cl.
*H02M 3/335* (2006.01)
*H02M 3/337* (2006.01)
*H02M 7/487* (2007.01)

(52) U.S. Cl.
CPC ....... *H02M 3/337* (2013.01); *H02M 3/33569* (2013.01); *H02M 7/487* (2013.01)

(58) Field of Classification Search
CPC .................. H02M 3/335–3/42; H02M 7/487
See application file for complete search history.

(56) References Cited

U.S. PATENT DOCUMENTS

| 2008/0247194 | A1 | 10/2008 | Ying et al. | |
|---|---|---|---|---|
| 2013/0223651 | A1* | 8/2013 | Hoyerby | H03F 3/2173 |
| | | | | 381/120 |
| 2014/0198536 | A1* | 7/2014 | Fu | H02M 3/33546 |
| | | | | 363/17 |

FOREIGN PATENT DOCUMENTS

| CN | 101018017 A | 8/2007 |
|---|---|---|
| CN | 101257255 A | 9/2008 |
| CN | 103944396 A | 7/2014 |
| CN | 104270026 A | 1/2015 |

OTHER PUBLICATIONS

International Search Report and Written Opinion dated Sep. 28, 2018 in International Patent Application No. PCT/CN2018/095717, 10 pages.

* cited by examiner

*Primary Examiner* — Kyle J Moody
*Assistant Examiner* — Peter M Novak
(74) *Attorney, Agent, or Firm* — Vierra Magen Marcus LLP

(57) ABSTRACT

A hybid resonant DC to DC converter uses an LLC or other resonant structure on the primary side, applying a two state waveform to one end of the resonant structure and a multi-state waveform to the other end of the resonant structure. The waveforms are at or near the resonant resonant frequency and the output voltage level is regulated by varying the shape of the multi-state waveform by varying the duty cycle of the switches used to generate it. The allows the converter to operate near or at its optimal resonant point, resulting in higher efficiency, over a wide range of regulated output voltage levels.

19 Claims, 16 Drawing Sheets

HYBRID RESONANT CONVERTER

PRIORITY CLAIM

This application claims the benefit of U.S. Provisional Pat. App. No., 62/532,789, filed Jul. 14, 2017, which is hereby incorporated by reference.

FIELD

The following is related generally to the field of direct current to direct current (DC to DC) converters and, more specifically, to resonant converters.

BACKGROUND

Resonant converters are a type of direct current to direct current (DC to DC) electric power converter that include a network of inductors and capacitors tuned to resonate at a particular frequency. A resonant converter may need to handle a wide range of input voltages and a wide range of output voltages. FIG. 1A shows an example of a resonant converter.

In this example, the transformer T 102 has a secondary winding 103 with a center tap c connected to drive the load, represented by the resistance RL 109, with the output voltage $V_O$ at an output node of the DC to DC converter, where $V_O$ is used to represent both the output node and the voltage level at that node. The center tap c is also connected to ground through the capacitor 105. The upper and lower taps of the secondary winding are connected to ground though the diode D1 138 on the one end and through the diode D2 139 on the other. The diodes D1 138 and D2 139 can also be replaced with actively controlled MOSFETs or other switches.

On the primary side, the LLC (inductor-inductor-capacitor) elements of the resonant tank are the inductors Lr 131 and Lm 133 and the capacitor Cr 135 that are connected in series between the node a and ground. The inductor Lm 133 is connected in parallel with the primary winding 101 of the transformer T 102. In this example, the inductor Lm 133 is connected through the capacitor Cr 135 on the one side, and on the other side to the node a through the inductor Lr 131. The switches $Q_1$ 121 and $Q_2$ 122 are connected between the + and – terminals of a DC input voltage source Vin 107 and are alternately switched on to a generate two-state waveform at the node a. The switches $Q_1$ 121 and $Q_2$ 122 can be implemented as MOSFETs or other transistors, for example.

FIG. 1B shows the waveform 11 at node a. The output voltage Vo is regulated by varying the frequency of the waveform, which often differs significantly from the resonant frequency of the resonant tank of inductors Lr 131 and Lm 133 and the capacitor Cr 135. For example, in an application as a battery charger for use with an electrical vehicle, the input voltage Vin could vary between 680-800 volts, while the DC output voltage Could be in the 400-750 volt range. In operating over such a wide range of input and output voltages, typical resonant converters are often far from their optimal resonant point, resulting in low efficiency.

SUMMARY

According to one aspect of the present disclosure, there is provided an apparatus that includes a DC to DC voltage converter having an input voltage node configure to receive an input voltage, a first bridge circuit, a second bridge circuit, and an intermediate circuit. The first bridge circuit is connected to the input voltage node and a ground node, and is configured to provide a first waveform to a first internal node. The second bridge circuit connected to the input voltage node, the intermediate voltage node and the ground node, and is configured to provide a second waveform to a second internal node, where the second waveform is a multi-state waveform. The intermediate circuit includes an inductor connected between the first internal node and the second internal node. The first inductor is configured to be driven by the first and second waveforms to provide an output voltage to an output voltage node.

Optionally, in the preceding aspect, another implementation of the aspect provides that the DC to DC voltage converter further includes a transformer having a primary coil and a secondary coil with a common core, wherein the output voltage node is connected to a first terminal of the secondary coil, and wherein the inductor is connected in parallel with the primary coil.

Optionally, in the preceding aspects, another implementation of the aspect provides that the intermediate circuit is a resonant tank.

Optionally, in the preceding aspect, another implementation of the aspect provides that the resonant tank of the DC to DC voltage converter comprises: the first inductor, a second inductor, and a first capacitor connected in series between the first internal node and the second internal node.

Optionally, in any of the preceding aspects, another implementation of the aspect provides that the first bridge circuit of the DC to DC voltage converter comprises: a first switch connected between the first internal node and the input voltage node; and a second switch connected between the first internal node and the ground node.

Optionally, in any of the preceding aspects, another implementation of the aspect provides that in the DC to DC voltage converter the second bridge circuit comprises: a third switch connected between the second internal node and the input voltage node; a fourth switch connected between the second internal node and the ground node; and an intermediate voltage switch connected between the intermediate voltage node and the second internal node.

Optionally, in the preceding aspects, another implementation of the aspect provides that in the DC to DC voltage converter the intermediate voltage switch comprises a fifth switch and a sixth switch connected in series between the intermediate voltage node and the second internal node.

Optionally, in any of the preceding aspects, another implementation of the aspect provides that in the DC to DC voltage converter the intermediate voltage switch comprises: a fifth switch through which the third switch is connected to the second internal node through a third internal node; a sixth switch through which the fourth switch is connected to the second internal node through a fourth internal node; a first diode connected between the third internal node and the intermediate voltage node; and a second diode connected between the fourth internal node the intermediate voltage node.

Optionally, in any of the preceding aspects, another implementation of the aspect provides that in the DC to DC voltage converter the intermediate voltage switch comprises: a fifth switch through which the third switch is connected to the second internal node through a third internal node; a sixth switch through which the fourth switch is connected to the second internal node through a fourth internal node; a seventh switch connected between the third internal node and the intermediate voltage node; and an eighth switch connected between the fourth internal node the intermediate voltage node.

Optionally, in any of the preceding aspects, another implementation of the aspect provides that in the DC to DC voltage converter further comprises a control circuit connected to the first bridge circuit and the second bridge circuit and configured to supply thereto a set of control signals having a cycle of a first frequency. The control circuit is configured to supply a set of control signals whereby the first bridge circuit generates the waveform to have the first frequency and to have at least a high value and a low value, whereby the second bridge generates the second waveform to have the first frequency and to have at least a high value, an intermediate value and a low value, an intermediate value and a low value, and wherein the first and second internal nodes are not concurrently at either of the corresponding high values or the corresponding low values.

Optionally, in the preceding aspects, another implementation of the aspect provides that in the DC to DC voltage converter the control circuit is configured to provide to the second bridge circuit control signals having an adjustable duty cycle, and that the control circuit is further configured to regulate the value of the output voltage by varying the duration of the duty cycle while maintaining the first frequency.

According to another aspect of the present disclosure, there is provided a system that includes a DC to DC voltage conversion system, comprising a DC to DC conversion circuit and a control circuit. The DC to DC conversion circuit includes an input voltage node, a first bridge circuit, a second bridge circuit, and an intermediate circuit. The first bridge circuit is connected to the input voltage node and a ground node, and is configured to provide a first waveform to a first internal node. The second bridge circuit connected to the input voltage node, the intermediate voltage node and the ground node, and is configured to provide a second waveform to a second internal node, where the second waveform is a multi-state waveform. The intermediate circuit includes an inductor connected between the first internal node and the second internal node. The first inductor is configured to be driven by the first and second waveforms to provide an output voltage to an output voltage node. The control circuit is configured to supply a set of control signals whereby the first bridge circuit applies to the first internal node the first waveform of the first frequency and having at least a high value and a low value, whereby the second bridge circuit applies to the second internal node the second waveform having at least a high value, an intermediate value and a low value, and wherein the first and second internal nodes are not concurrently at either of the corresponding high values or the corresponding low values.

Optionally, in any of the preceding aspects, another implementation of the aspect provides that the control circuit of the system circuit is configured to provide to the second bridge circuit control signals having an adjustable duty cycle.

Optionally, in any of the preceding aspects, another implementation of the aspect provides that the control circuit of the system circuit is configured to regulate the value of the output voltage by varying the duration of the duty cycle while maintaining the first frequency.

According to an additional aspect of the present disclosure, there is provided a method that includes generating a DC output voltage from a DC input voltage. The method includes receiving an input voltage and generating a first waveform and a second waveform from the input voltage. The first waveform and the second waveform are respectively received at a first node and a second node of a DC to DC voltage converter. The DC to DC voltage converter includes a resonant tank connected between the first node and the second node and an output node connected to the resonant tank. The DC to DC voltage converter generates from the first and second waveforms an output voltage at the output voltage node. The first waveform has a cycle of a first frequency with a high value in a second part of the cycle and a low value in a first part of the cycle. The second waveform is a multi-level waveform of the first frequency with the high value for a first portion of the first part of the cycle and an intermediate value for a second portion of the first part of the cycle, and with the low value for a first portion of the second part of the cycle and the intermediate value for a second portion of the second part of the cycle, the intermediate value being between the high value and the low value.

Optionally, in any of the preceding aspects, another implementation of the aspect provides that the method further includes that the first portion of the part of the cycle is of substantially the same duration as the first portion of the second part of the cycle.

Optionally, in any of the preceding aspects, another implementation of the aspect provides that the method further includes regulating the value of the output voltage by varying a duration of the first portion of one or both of the first part of the cycle or the second part of the cycle while maintaining the first frequency.

Optionally, in any of the preceding aspects, another implementation of the aspect provides that the method of generating the second waveform includes receiving first, second, third and fourth control waveforms at first, second, third, and fourth switches, respectively, wherein the first switch is connected between the input voltage and the second node, the second switch is connected between ground and the second node, and the third and fourth switches are connected in series between the second node and an intermediate node configured to supply the intermediate value.

Optionally, in any of the preceding aspects, another implementation of the aspect provides that the method includes that the first and third control waveforms are non-overlapping, the first control waveform being high during the first portion of the second part of the cycle, and wherein the second and fourth control waveforms are non-overlapping, the second control waveform being high during the first portion of the first part of the cycle.

Optionally, in any of the preceding aspects, another implementation of the aspect provides that the method provides that the first and second control waveforms have substantially equal duty cycles and that the method further includes regulating the value of the output voltage, the regulating including varying durations of the duty cycle of the first and second control waveforms while maintaining the first frequency.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

The following presents examples of multi-level hybrid DC to DC converters that can operate at or near the converter's resonant point across a wide range of input and output levels. A first set of embodiments use an LLC resonant converter topology, but where the series connected LLC elements are driven by a hybrid combination of a two-state waveform from one end and a multi-state (i.e., more than two states) waveform from the other end. The DC converter circuit regulates the output voltage by varying the duty cycle of the multi-state waveform, while maintaining the frequency of the waveforms at or near the resonant point, resulting in high efficiency of operation. The embodiments of multi-level hybrid converters presented can be used across a wide range of voltage levels, including high voltage levels. For example, they can be applied to power supply systems requiring a regulated output voltage level. Particular examples can include battery charging circuits with input and output voltages that can be in the range of several hundred volts, such a battery charger for use with an electrical vehicle, where the input voltages could be in the 680-800 volt range and the output could be in the 400-750 volt range. These applications are by way of example only, and it is understood that the multi-level hybrid converters of the present technology may be used in other applications.

Figure 2A:
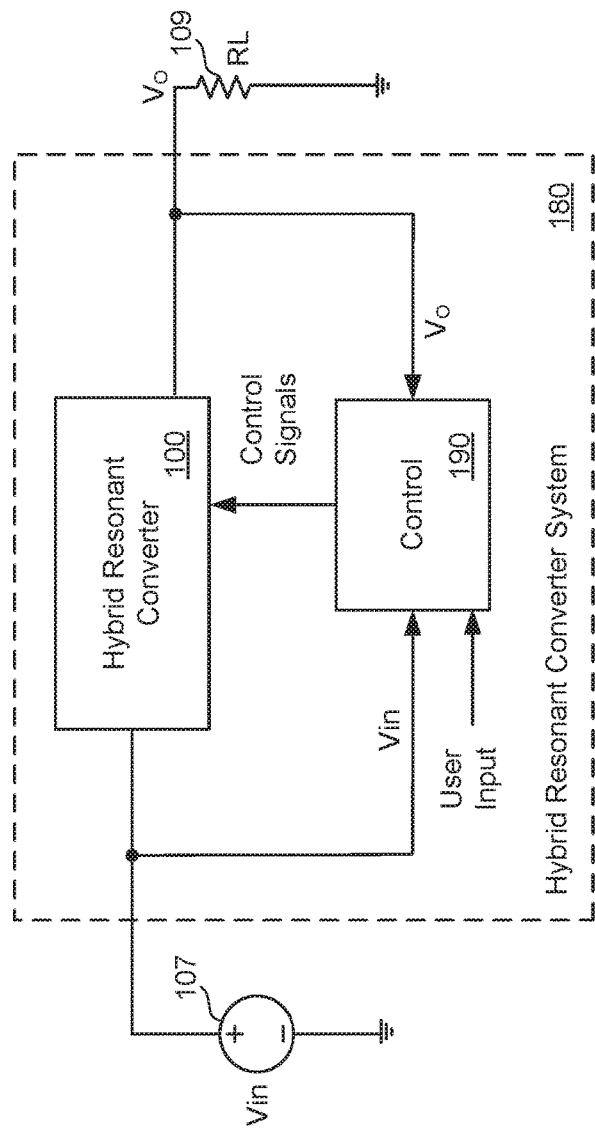
FIG. 2A shows an embodiment of a hybrid resonant converter system.

FIG. 2A shows a first embodiment of the multi-level hybrid resonant converter system 180, including a control block 190 as well as a hybrid resonant converter 100. The hybrid resonant converter 100 is connected to a DC voltage source Vin 107 and generates a DC output voltage $V_O$ at an output node (also labelled as $V_O$) that can be connected to drive a resistive load RL 109. The hybrid resonant convert 100 is connected to receive a set of control signals from the control block 190 that can be used to regulate the output voltage $V_O$. The circuit of the control block 190 is connected to receive the DC output voltage $V_O$ and the DC input voltage Vin. The control block 190 can be adjusted, such as by user input, to generate control signals that the hybrid resonant converter system 180 uses to regulate the output voltage level $V_O$ relative to the input voltage level Vin.

Figure 2C:
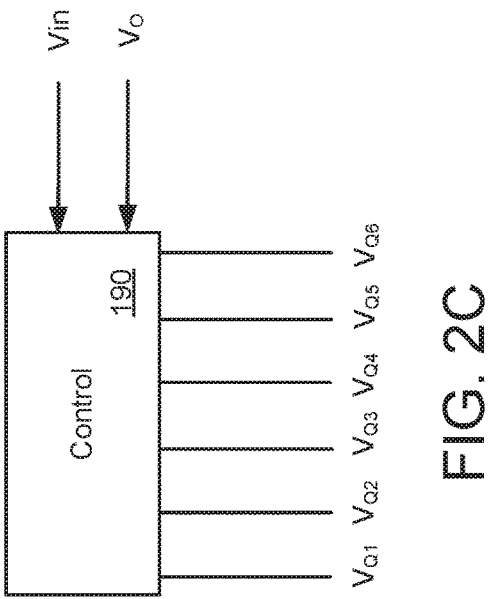
FIGS. 2B and 2C show embodiments of a hybrid resonant converter and control block for the system of FIG. 2A.
Figure 2B:
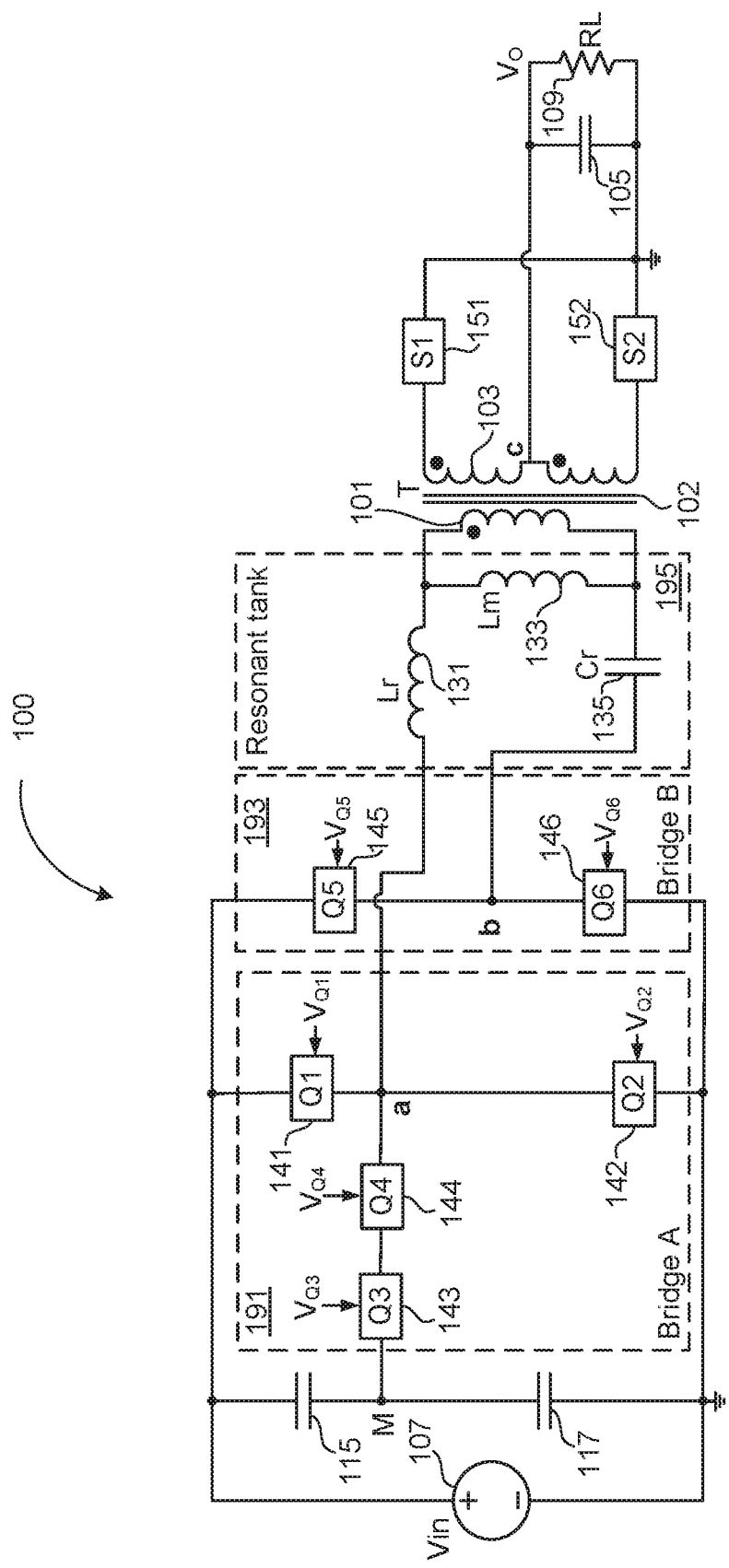

FIG. 2B presents one embodiment for a multi-level hybrid resonant converter circuit 100. In this embodiment of the multi-level hybrid resonant converter circuit 100, the transformer T 102 has a secondary winding 103 with a center tap c connected to drive the load, represented by the resistance RL 109, with the output voltage $V_O$. The center tap c is also connected to ground through the capacitor 105. The upper and lower taps of the secondary winding 103 are connected to the circuits low voltage level (here referred to as ground) though the switch S1 151 on the one end and through the switch S2 152 on the other. The switches S1 151 and S2 152 can be implemented as diodes in some embodiments. Active switching, or synchronous rectification, can also be used to reduce conduction loss, with the switches S1 151 and S2 152 being implemented as MOSFETs in some embodiments. To take the example of a battery charger application, the resistance RL 109 represents the load of the battery or batteries being charged and $V_O$ is the regulated charging voltage.

On the primary side to the left of the transformer T 102 in FIG. 2B, the LLC elements of a resonant tank 195 are the inductors Lr 131 and Lm 133 and the capacitor Cr 135 that are connected in series between the node a and the node b. The inductor Lm 133 is connected in parallel with the primary winding 101 of the transformer T 102. In this example, the inductor Lm 133 is connected through the capacitor Cr 135 on the one side, and on the other side to the node a through the inductor Lr 131, but other series arrangements of the LLC elements can be used in other embodiments.

Figure 1A:
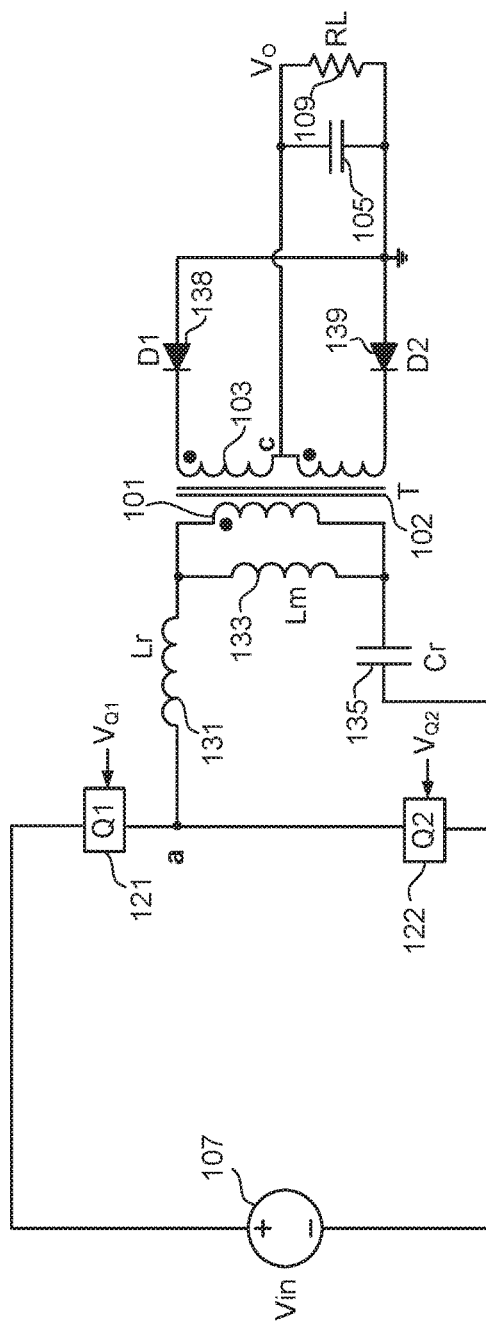
FIGS. 1A and 1B show a prior art example of a resonant converter and a corresponding waveform.
Figure 1B:
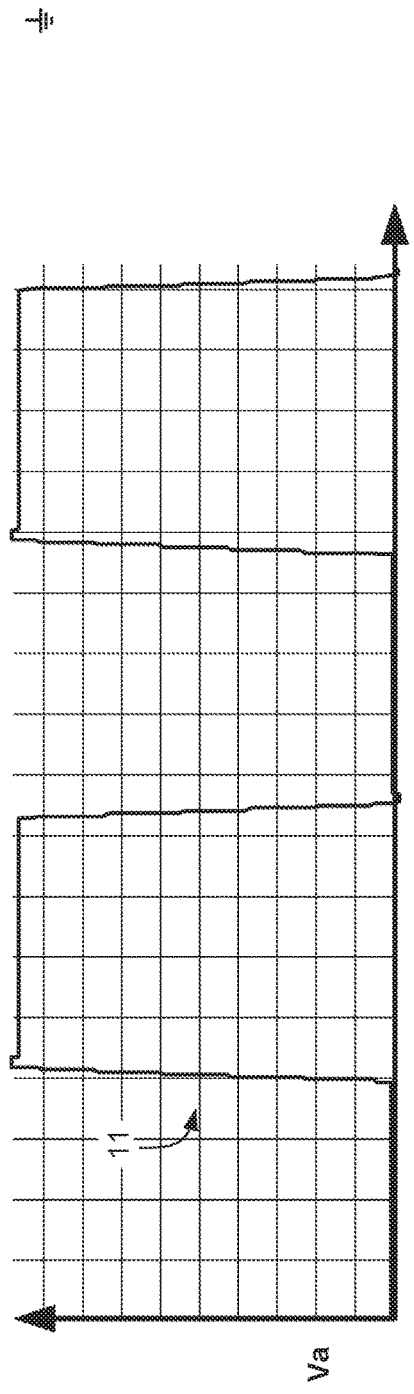

The switches Q5 145 and Q6 146 form one embodiment of a first bridge circuit, Bridge B 193. The node b is connected to ground through the switch Q6 146 and to the high value of an input voltage through the switch Q5 145, where the input voltage is represented as the voltage supply Vin 107. As described further below, the switches Q5 145 and Q6 146 generate a two-state waveform at the node b that is at or near the resonant frequency of the resonant tank 195. This will be similar to the sort of operation described above with respect to FIGS. 1A and 1B, but can use a fixed frequency as the voltage level of the output $V_O$ that can be regulated by varying the duty cycle of the waveform at node a. In some embodiments, the switches Q5 145 and Q6 146 are implemented as MOSFETs.

An embodiment for a second bridge structure Bridge A 191 is formed by the switches Q1 141, Q2 142, Q3 143, and Q4 144. The resonant converter 100 is a hybrid converter in that, although node b uses a two-state waveform generated by Bridge B 193, node a uses a multi-state waveform generated by Bridge A 191 using the switches Q1 141, Q2 142, Q3 143, and Q4 144 from the high and low values of the input voltage and an intermediate voltage level, such as can be provided by a voltage divider. One embodiment for the voltage divider is given by the capacitors 115 and 117. Node a is connected through Q3 143 and Q4 144 to an intermediate voltage node M of a voltage divider formed by the capacitors 115 and 117, which in turn are connected in series between Vin 107 and ground. In the examples here, the capacitors 115 and 117 are taken to have the substantially equal (i.e., within a few percentage) capacitance values so the intermediate voltage node will be at Vin/2. The node a is connected to Vin 107 through switch Q1 141 and to ground through switch Q2 142. Although in the examples discussed here the capacitors 115 and 117 are taken with the same capacitance so that the intermediate node M is at or near Vin/2, other voltage values can be obtained at the intermediate node M if wanted, by varying the relative capacitances in the voltage divider.

FIG. 2C is a block diagram of an embodiment for control circuit block 190 to provide the switching waveforms for controlling the switches Q1-Q6 141-146 for the multi-level hybrid resonant converter system 180. In some embodiments, the switches Q1-Q6 141-146 can be implemented as MOSFETs. The control signal waveforms $V_{Q1}$, $V_{Q2}$, $V_{Q3}$, $V_{Q4}$, $V_{Q5}$ and $V_{Q6}$ generated for the switches are selected to provide soft switching for the power semiconductors under all operation range. (For the embodiments discussed below with respect to FIGS. 10-12, the control circuitry would similarly provide the additional control signals $V_{Q7}$, $V_{Q8}$, $V_{Q9}$, $V_{Q10}$, $V_{Q11}$ and $V_{Q12}$.) On the primary side, switcher Q1-Q6 141-146 have zero voltage switching (ZVS) and, on the secondary side, the switches S1 151 and S2 152 have zero current switches (ZCS). By varying the duty cycle on switches Q1-Q4 141-144 while maintaining the frequency of the control waveforms for these switches, the LLC resonant converter 100 can operate at the resonant point of the resonant tank 195 for a wide operation range. The control circuit 190 can have both Vin and $V_O$ as inputs to determine the appropriate switching waveforms to obtain the desired $V_O$/Vin ratio, where user input, which can come from other elements in a larger system or by direct control, can be used to set the ratio of $V_O$ to Vin.

Figure 2D:
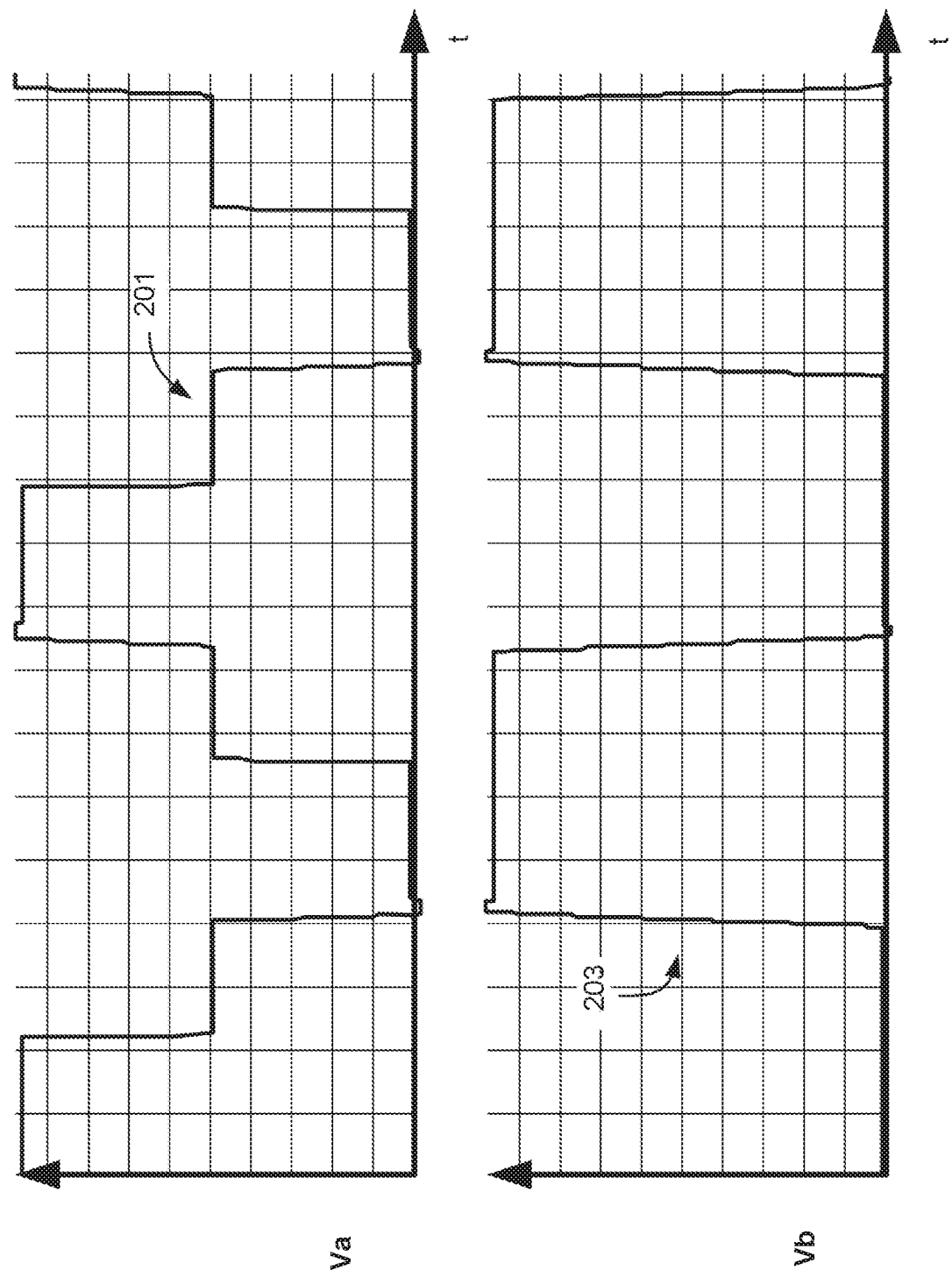
FIG. 2D shows examples of multi-state and two-state waveforms applied to the elements of the resonant converter of FIG. 2B.

FIG. 2D shows the waveforms at nodes a and b respectively generated by Bridge A 191 and Bridge B based on a set of control waveforms from control circuit 190 for a switching sequence, such as illustrated below with respect to FIG. 3. At the top, FIG. 2D shows Va, the multi-state waveform 201 (three-state in the examples here) at the Bridge A 191 voltage point of node a which has the high value Vin, intermediate value Vin/2, and low value of ground. The levels correspond to the + terminal of the Vin voltage source 107, the intermediate node M of the voltage divider between 115 and 117, and the − terminal (or ground) of Vin 107, where node a is respectively connected to these levels by switches pairs (Q1 141, Q3 143) and (Q4 144, Q2 142), as described further with respect to FIG. 3. In other embodiments, multi-state waveforms with more than three states can be used by using a different bridge structure. At the bottom, FIG. 2D has the 2-state waveform 203 of Vb, being either at the level corresponding to the + terminal of the Vin voltage source 107 or the − terminal (or ground) of Vin 107. The switching sequence can operate near or at the DC to DC converter's resonant frequency to achieve the best efficiency of operation, while control of the duty cycle for the switches Q1-Q4 141-144 is used to regulate the output voltage Vo.

Figure 3:
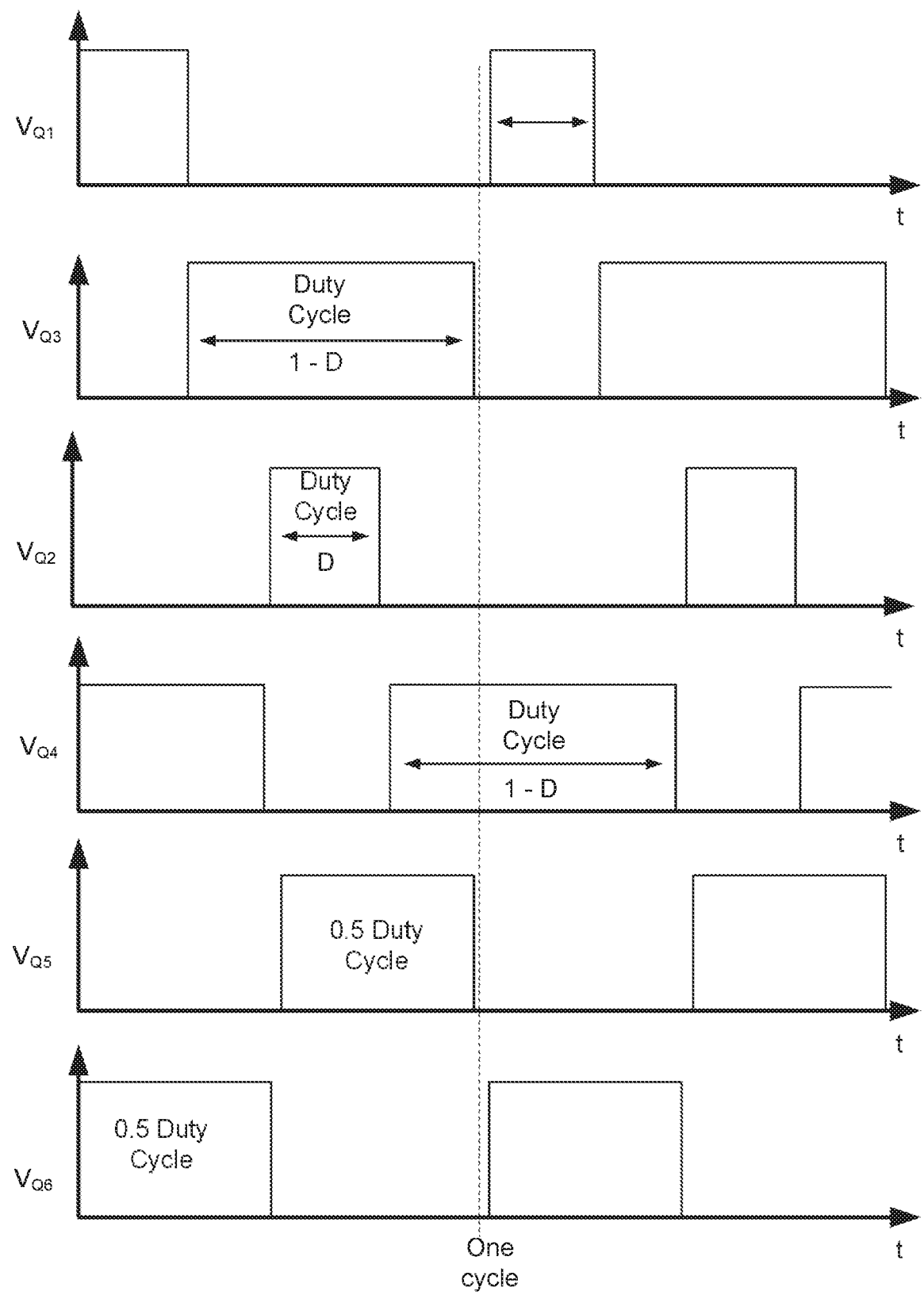
FIG. 3 is an example of a switching sequence to generate the waveforms of FIG. 2D in the circuit of FIG. 2B.

FIG. 3 shows one embodiment for the set of control waveforms $V_{Q1}$, $V_{Q2}$, $V_{Q3}$, $V_{Q4}$, $V_{Q5}$ and $V_{Q6}$ for the switches Q1-Q6 141-146 to generate the Va and Vb waveforms of FIG. 2D. Staring at the bottom of FIG. 3, this shows that the control voltages $V_{Q5}$ and $V_{Q6}$ for the switches Q5 145 and Q6 146 are non-overlapping and both have a fixed duty cycle of 0.5. When the control waveform $V_{Q6}$ is high, Q6 146 is on and Vb is at its low state; and when the control waveform $V_{Q5}$ is high, Q5 145 is on and Vb is at its high state. For the representation shown here, these are arranged such that switch Q6 146 is on during the first half cycle and switch Q5 145 is on in the second half cycle. The resultant two-state Vb waveform on node b is shown as the bottom trace 203 of FIG. 2D.

To generate the three-level waveform at node a, switches Q1 141 and Q2 142 respectively turn on at the start of the first and second half cycles, both having the same duty cycle D (or, more generally, substantially the same, where these differ by a few percent, +/−10% for example) which can range from 0 to 0.5. Switch Q3 143 has a switching waveform $V_{Q3}$ that is non-overlapping with $V_{Q1}$ for switch Q1 141; and switch Q4 144 has a switching waveform $V_{Q4}$ that is non-overlapping with $V_{Q2}$ for switch Q2 142. Switches Q3 143 and Q4 144 consequently have substantially the same duty cycles of (1−D), as illustrated in the top and middle parts of FIG. 3.

The resultant Bridge A 191 voltage point waveform Va is the multi-state waveform of the top trace 201 in FIG. 2D. Under this arrangement, $$V_O/Vin = 2D + (1-2D)/2 = (1+2D)/2,$$

so that $V_O$ can be regulated by varying D over the range 0-0.5 to generate a ratio of $V_O$/Vin=0.5-1. The examples here are discussed in the context of a fixed frequency in order to maintain efficiency; however, if desired, the waveforms can also have a variable frequency if, for example, a wider range of $V_O$/Vin ratios is wanted. Note that in the limiting cases of D=0, Va is just flat at Vin/2 and Vo =½ Vin; and for D=0.5, Va will become a two state waveform as for Vb, but off-set half a cycle, and Vo=Vin. Under the switching sequence illustrated in FIG. 3, at all input voltage ranges and all load conditions, the circuit achieves zero voltage switching (ZVS) for all of the primary side MOSFET switches (Q1-Q6) and zero current switching (ZCS) for switches S1 151 and S2 152 on the secondary side. The frequency is again taken to be at or near the circuit's resonant frequency.

Considering one embodiment for implementation, the switches Q1 141, Q2 142, Q5 145 and Q6 146 are connected between one of either node a or node b on one side, and to either ground or Vin on the other side. These switches voltage clamp to Vin and can use, for example, 100V MOSFETs. The switches S1 151 and S2 152 on the secondary side voltage clamp to 2Vo and can be implemented as 40V devices. The switches Q3 143 and Q4 144, that connect node a to the mid-level voltage, clamp to Vin/2 and can be implemented as 60V MOSFETs. Referring back to FIG. 3, in such an embodiment during the duration of duty cycle D, two of the 100V MOSFETs conduct. During the rest of the cycle with a duration of 0.5-D, two 60V MOSFETs and one 100V MOSFET conduct.

Figure 4A:
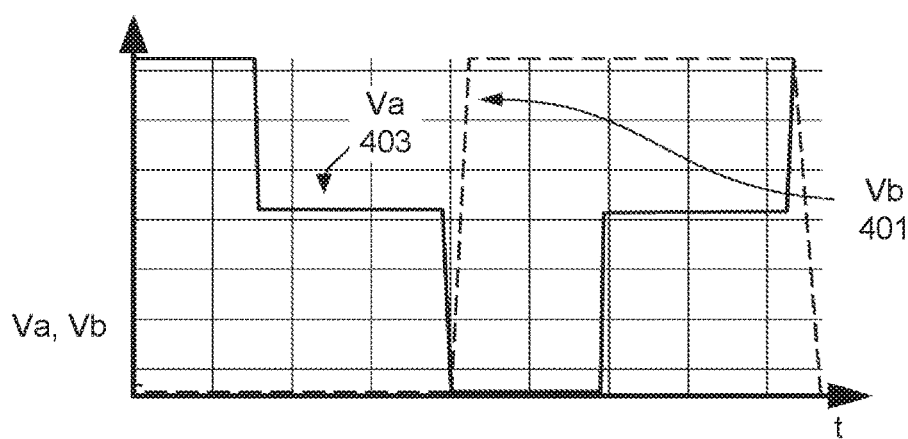
FIGS. 4A-4D, 5A-5D and 6 are sets of waveforms showing the operation of the circuit of FIG. 2B for different Vin, $V_O$ combinations.
Figure 4B:
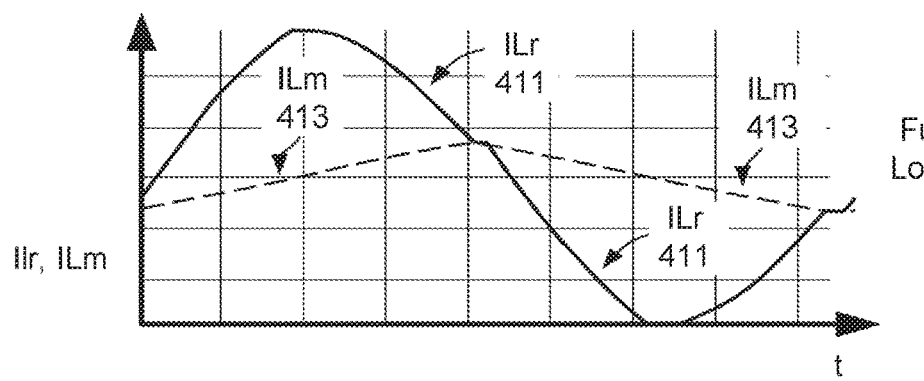
Figure 4C:
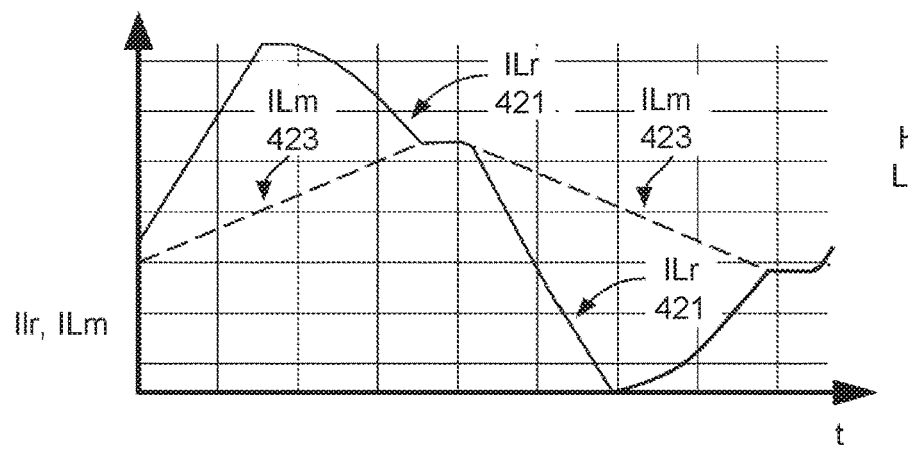
Figure 4D:
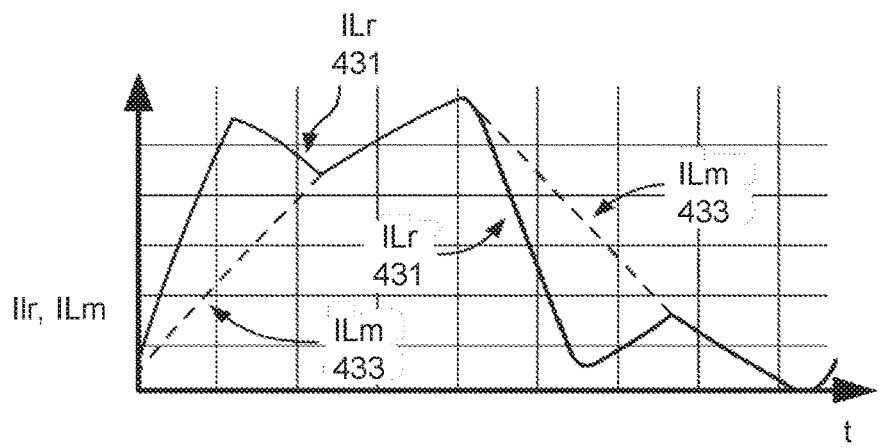

FIGS. 4A-4D and 5A-5D are additional simulated waveforms for the circuit of FIG. 2B, but for different combinations of Vin and $V_O$. For FIGS. 4A-4D, Vin=600V and $V_O$=400V. In FIG. 4A, the voltages Va and Vb at the nodes a and b are shown at respective traces 401 and 403. For a Vin of 600V and a regulated $V_O$ of 400V, D=⅙ and Va in trace 401 is at Vin/2 twice as long as the low or high value. FIGS. 4B-4D respectively show the current ILr 411 through Lr 131 and the current ILm4 11 through Lm 133 at full load (FIG. 4B), half load (FIG. 4C) and 10% load (FIG. 4D). Under a full load (FIG. 4B), the current 411 through Lr 131 is relatively sinusoidal, and the current 413 through Lm 133 is relatively flat with a linear rise and fall, as a greater amount of current flows through the primary coil of the transformer and is delivered to the load. As the load decreases to half load (FIG. 4C) and 10% load (FIG. 4D), so that less current is drawn by the primary coil 101, the currents ILm 423 and ILm 433 in FIGS. 4C and 4D, respectively, through Lm 133 increase closer to the currents ILr 421 and ILr 431, respectively, through Lr 131.

Figure 5A:
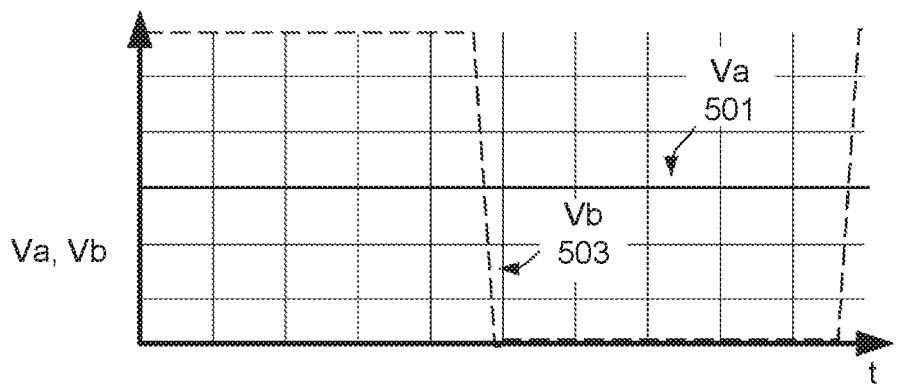
Figure 5B:
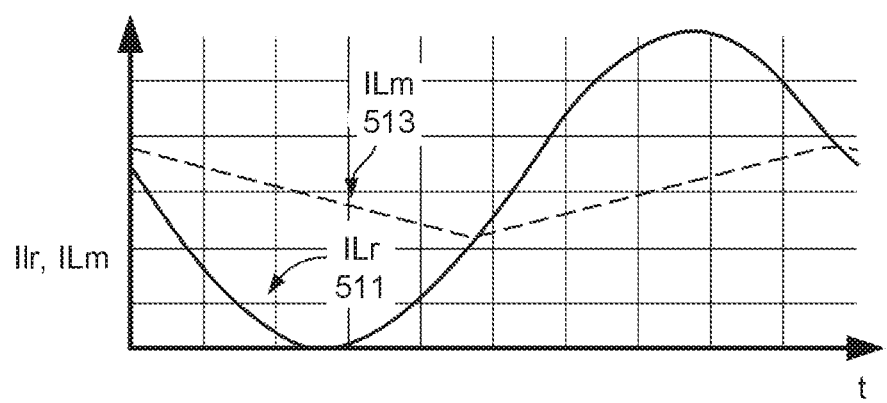
Figure 5C:
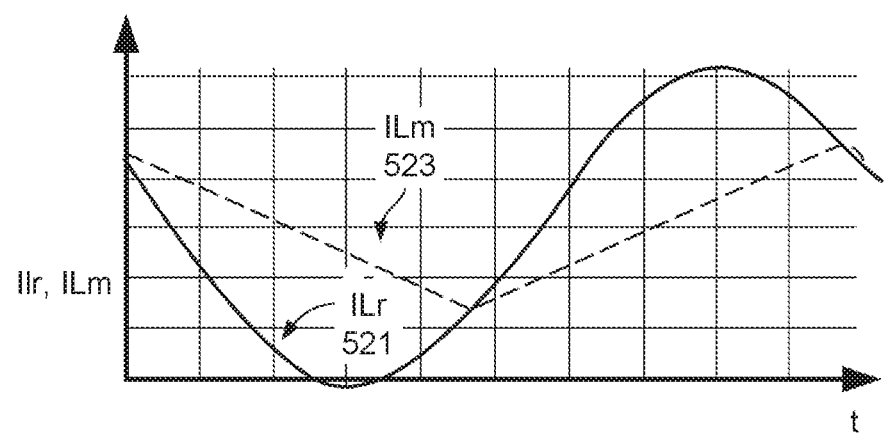
Figure 5D:
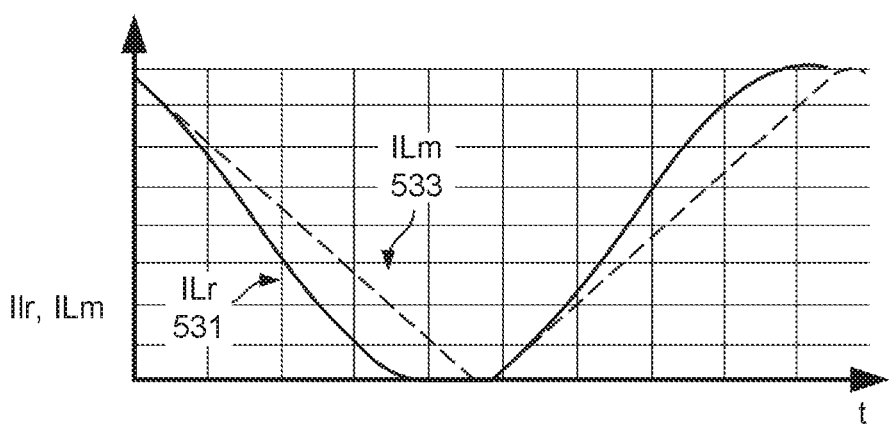

In FIGS. 5A-5D, Vin=800V and $V_O$=400V. For FIG. 5A, $V_O$=½ Vin and D=0, so that Va is flat at ½ Vin, as shown at 501, while Vb is still the two-state waveform 503. Consequently, in this limit the circuit of FIG. 2B tends to a two-state mode. The next three sets of traces (FIGS. 5B-5D) underneath again show the current ILr 511 through Lr 131 and the current ILm 511 through Lm 133 at full load (FIG. 5B, respectively 511, 513), half load (FIG. 5C, respectively 521, 523) and 10% load (FIG. 5D, respectively 531, 533). For this $V_O$/Vin ratio, the current through Lr 131 stays relatively sinusoidal, but as the load decreases less current is drawn by the primary coil 101 of the transformer T 102 and more current flows through Lm 133, with ILm 511 more closely tracking ILr 513.

Figure 6:
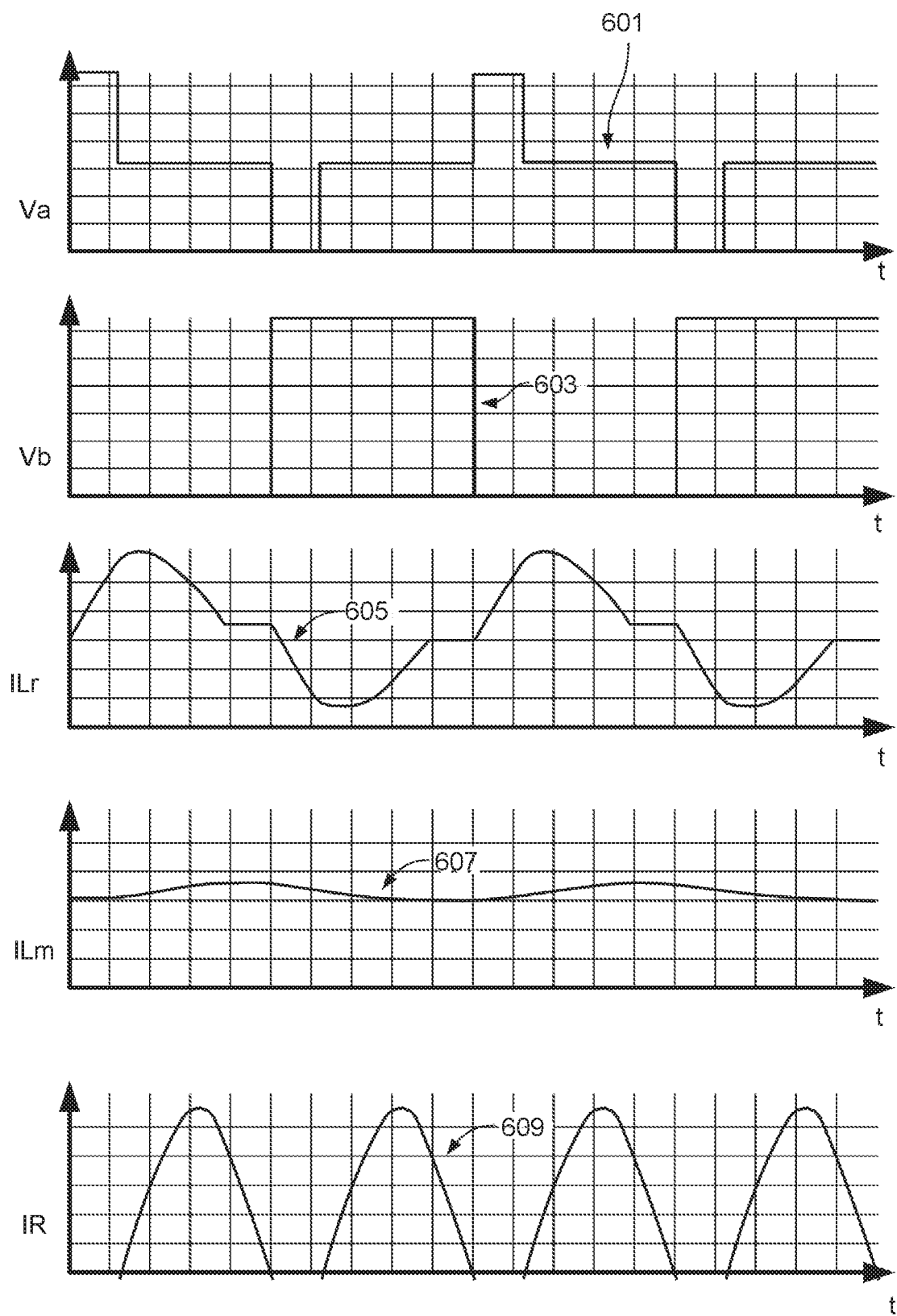

FIG. 6 shows another set of simulation waveforms, in this case for Vin=680V and $V_O$=400V. The Va and Vb waveforms (respectively 601, 603) are respectively in the first and second waveform, showing a relatively small, but non-zero duty cycle. The current waveform 605 through Lr 131 (middle waveform) and the current waveform 607 (fourth waveform) through Lm 133 are again shown, along with the current IR (bottom) with waveform 609 supplied to the load RL 109. This example is at or near full load, so that ILm is relatively flat and the variation of ILr 605 is largely sent through the primary coil 101 of the transformer T 102. On the secondary side, the current is the delivered to the load as shown by the IR waveform 609 at bottom.

Figure 7:
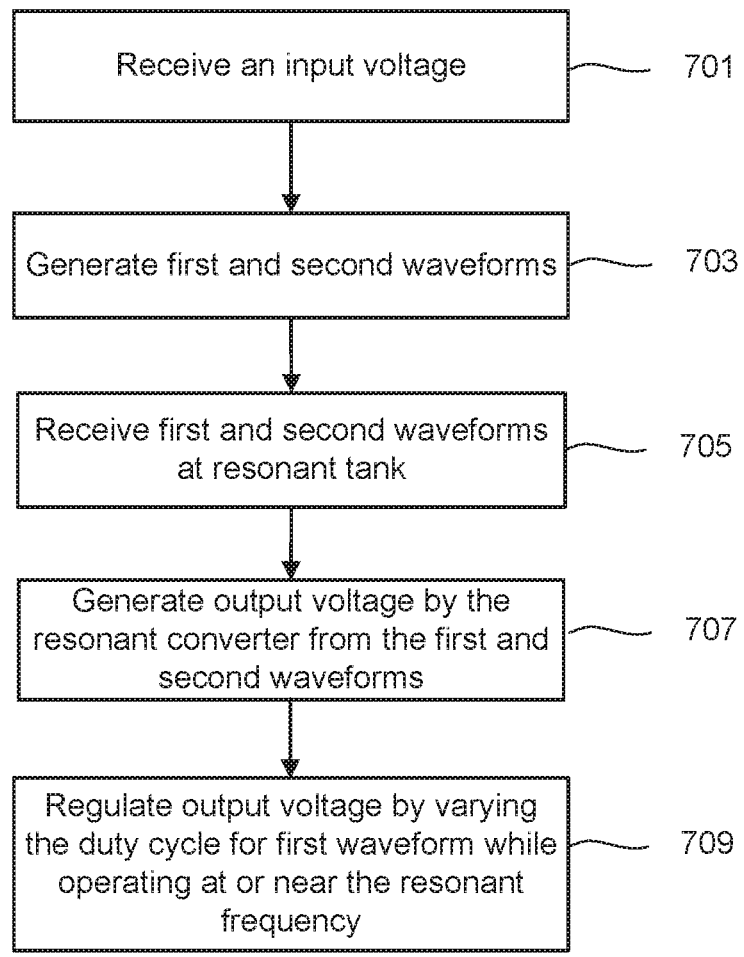
FIG. 7 is a flow chart illustrating aspects of the operation for one embodiment of the system of FIG. 2A.

FIG. 7 is flow chart illustrating the operation of the system of FIGS. 2A-2D. At 701 the input voltage Vin received. To generate $V_O$ from Vin, at 703 the control circuity generates the 2-state waveform at the first bridge (Bridge B 193) for node b and the multi-state waveform for node a at the second bridge (Bridge A 191), as described above with respect to FIG. 3. The waveforms are received at the resonant tank 195 of Lr 131, Lm 133, and Cr 135 at 705, generating the output voltage $V_O$ for the load at 707. The output voltage $V_O$ is regulated at 709 by continuing to operate at or near the resonant frequency (such as within a few percent, within +/−10% for example), but varying the duty cycle used to generate the waveform at node a. The duty cycle can be varied as described above with respect to FIG. 3 to keep the $V_O$/Vin ratio regulated to provide the desired $V_O$ across a range of Vin values.

Figure 8A:
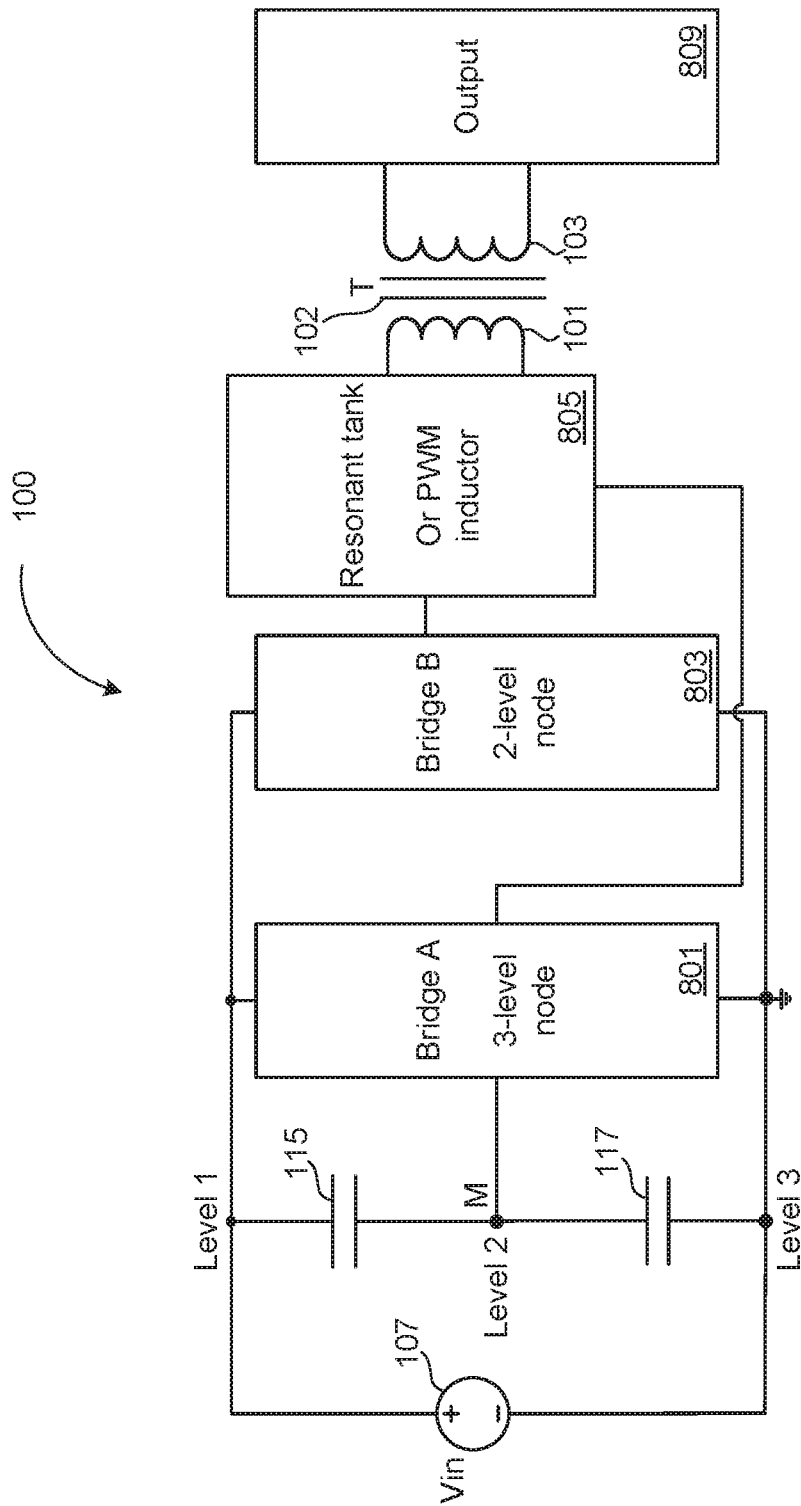
FIGS. 8A, 8B, 9A and 9B look at embodiments of the DC to DC voltage converter in a more general context.

FIGS. 8A provides a generalization of the hybrid resonant converter of FIG. 2B. In such embodiments for a DC to DC voltage converter 100, the LLC section of Lr 131, Lm 133 and Cr 135 can be replaced as shown in block 805 by a more general resonant tank of combinations of inductors and capacitances (such as LC, LCL, LCLC and so on), or with a pulse width modulation (PWM) inductor, such as a single inductor or combination of one or more inductors and DC blocking capacitors. In either case, the resonant tank or PWM inductor 805 is connected between Bridge B 803 and Bridge A 801, with an inductor in parallel with the primary coil 101. Bridge B 803 is a generalization of switches Q5 145 and Q6 146 that provides a two level (either level 1 on the top rail of Vin or level 2 on the bottom rail of ground) to the upper input node of the resonant tank or PWM inductor 805. Bridge A 801 is a generalization of the switches Q1-Q4 141-144 and provides a three level (level 1, level 2 or level 3 of ½ Vin at the intermediate node M) to the lower input node of the resonant tank or PWM inductor 805. As described above with respect to FIGS. 2-7, the output voltage $V_O$ provided by output section 809 can be regulated by varying the duty cycle within Bridge A 801.

Figure 9A:
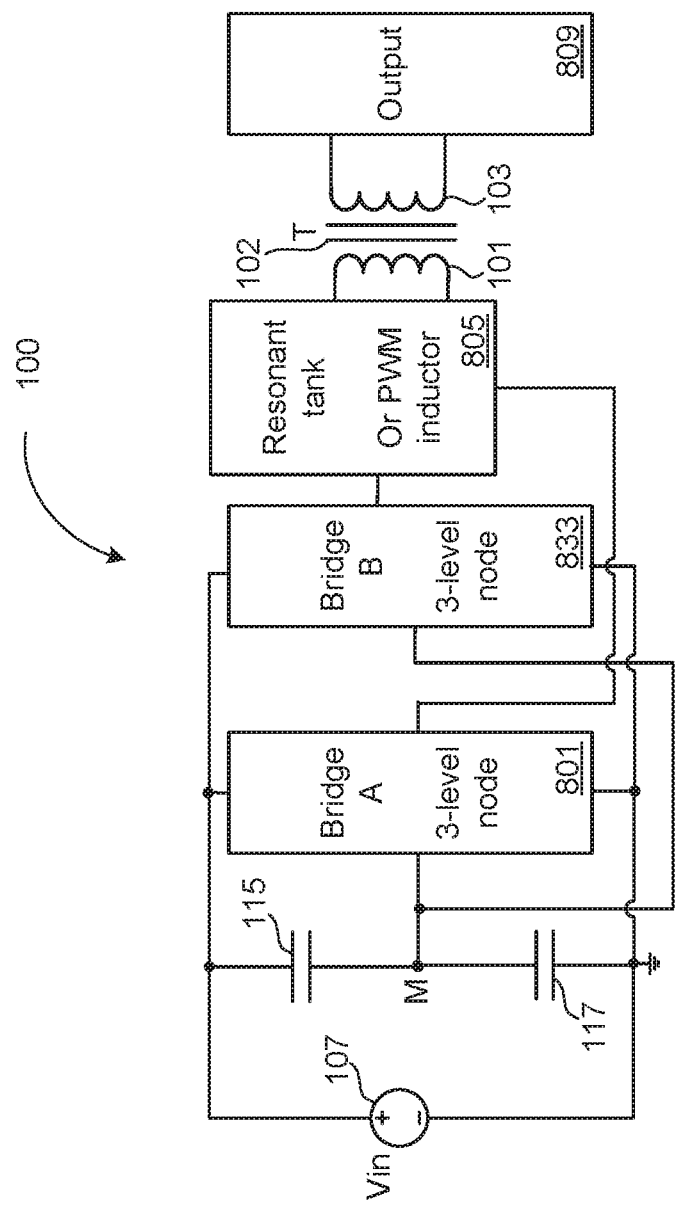

In other embodiments Bridge B can also generate a 3-level waveform for the upper input of the resonant tank or PWM inductor 805, as illustrated in FIG. 9A for Bridge B 833. In embodiments of FIG. 9A, Bridge A 801 and the other elements can have a similar structure to embodiments described with respect to FIG. 9A. Unlike FIG. 9A, in FIG. 9B Bridge B 833 is now also connected to the intermediate node M to receive the intermediate voltage level. This allows for Bridge B 833 to also provide a multi-state waveform to the resonant tank or PWM inductor 805.

Figure 10:
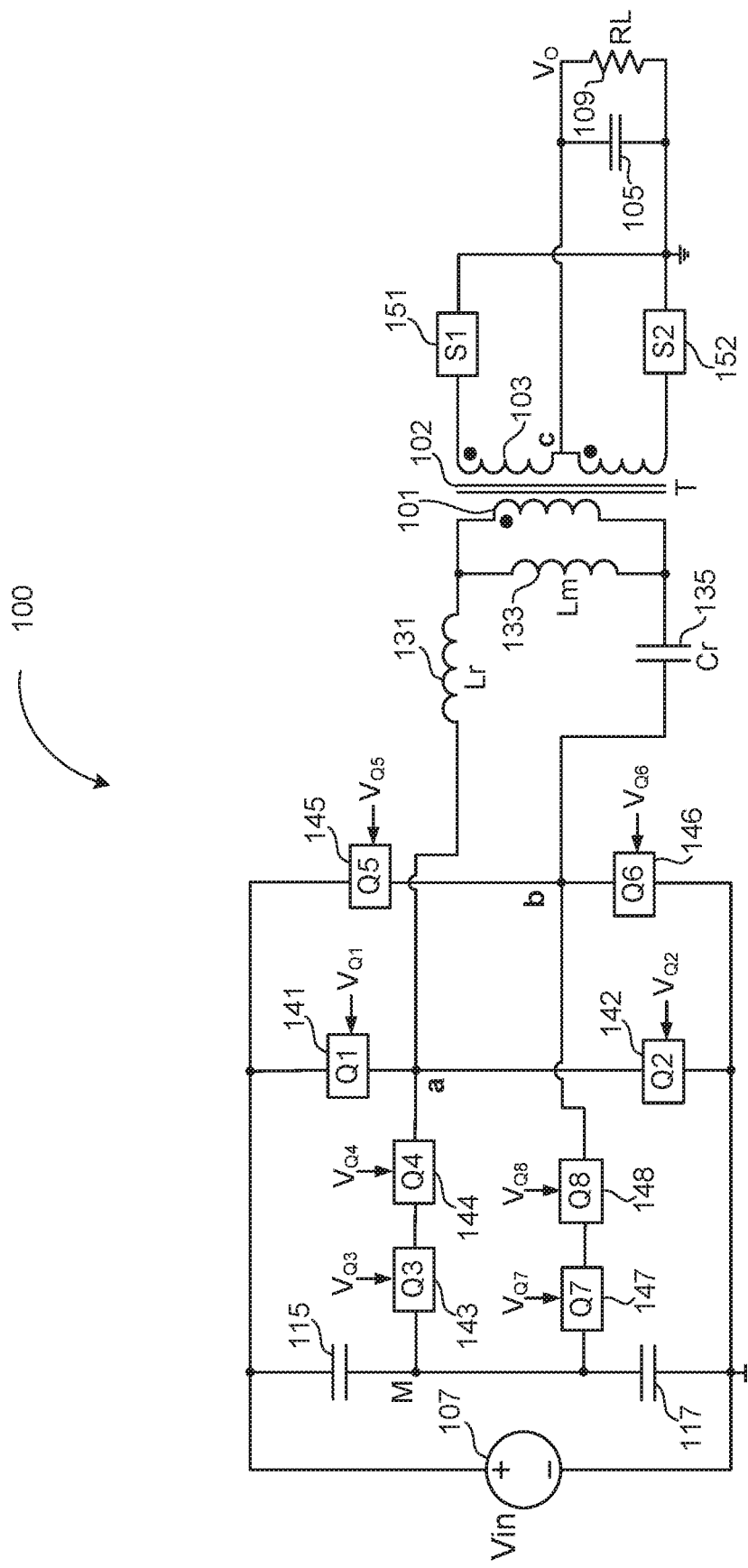
FIGS. 10-12 present alternate embodiments for resonant converters that use extended topologies.

FIG. 10 shows an example of an embodiment where both bridge circuits use 3-level waveforms. Relative to FIG. 2B, the embodiment of FIG. 10 adds an additional pair of switches Q7 147 and Q8 148 that can be implemented as MOSFETs, similar to as described above for Q3 143 and Q4 144, with control signals $V_{Q7}$ and $V_{Q8}$. The inclusion of Q7 147 and Q8 148 allow for a multi-state waveform to also be applied to node b, where this can be generated by switches Q5-Q8 145-148 analogously to the generation of Va by Q1-Q4 141-144 as described with respect to FIG. 3. By using a variable duty cycle D" for Q5-Q8 145-148 that is independent of the duty cycle D for Q1-Q4 141-144, the $V_O$/Vin range can be extended to from 0 to 1 by additionally varying D" as well as D.

All of the embodiments described so far have included isolation, where the input is connected to the output through the transformer T 102 to isolate any DC offset from the input side. This is illustrated in FIGS. 8A and 9A, where the input side is connected to the primary coil 101 of transformer T 102, and the output side is connected to the secondary coil 103. It is also possible to provide embodiments without isolation, where the output is connected to the resonant tank without the intervening transformer. This illustrated in the embodiments of FIGS. 8B and 9B, which correspond to FIGS. 8A and 9A respectively, but without the isolation provided by the transformer T 102.

Figure 8B:
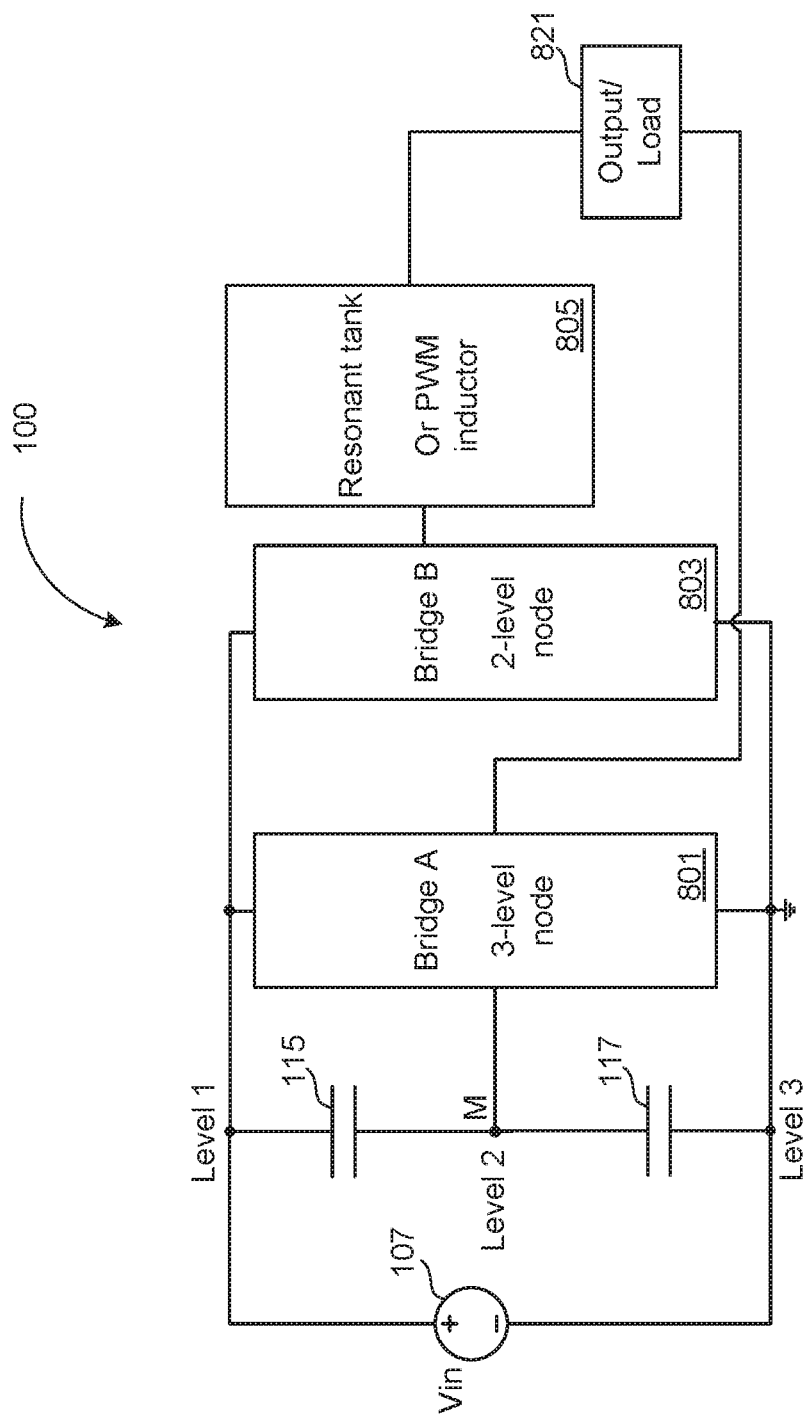

In FIG. 8B, the transformer T 102 of FIG. 8A is removed. Rather than having an output node connected to the intermediate circuit of the resonant tank or PWM inductor 805 through the transformer T 102 as in FIG. 8A, in FIG. 9B the output or load 821 is now connected to the resonant tank or PWM inductor 805 without isolation. In the example of FIG. 8B, the output or load 821 is connected through the resonant tank or PWM inductor 805 to Bridge B 803 on the one side, and connected to Bridge A 801 on the other side. The load can, for example, be a resistive load such as a battery or a combination of a resistive load and rectifiers. The current though the load would then correspond to the load through the primary coil 101 in FIG. 8A.

Figure 9B:
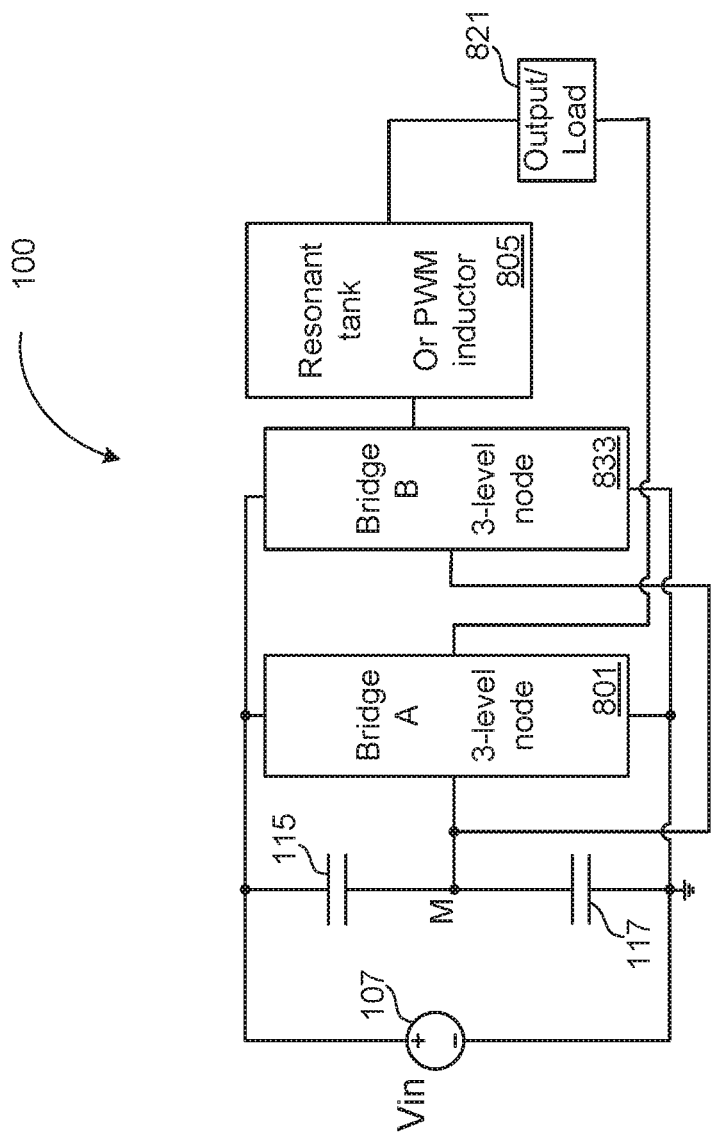

Similarly, in FIG. 9B relative to FIG. 9A, the transformer T 102 of FIG. 9A is removed. In this example, the output node or load 821 is again connected the three level Bridge A 801 and three level Bridge B 833. The intermediate circuit of the resonant tank or pulse width modulation (PWM) inductor 805, such as a single inductor or combination of an inductor and a DC blocking capacitor, is connected between Bridge B 833 and the load 821. The current though the load would then correspond to the load through the primary coil 101 in FIG. 9A.

In each of the embodiments of FIGS. 8A, 8B, 9A and 9B, Bridge A 801 generates a three-level waveform, such as shown at 201 for Va in FIG. 2D. In other embodiments, multi-state bridge circuits with more than three states can be used. Similarly, although Bridge B 833 of FIGS. 9A and 9B generates a three-level waveform, multi-state bridge circuits with more than three states can be used in other embodiments.

Considering FIGS. 8A, 8B, 9A, and 9B, the DC to DC converters of these figures includes a first bridge circuit module (Bridge A 801) that is connected between the + and − terminals of the input voltage source 107 and also to an intermediate voltage level. In this example, the intermediate voltage level is provided by an intermediate node M of the voltage divider of capacitors 115 and 117, which are also connected between the + and − terminals of the input voltage source 107, but, more generally, other means can provide this intermediate voltage level. The bridge circuits then generate the multi-state waveform applied to the resonant tank or load. Specific arrangements of switches and diodes are used in the examples presented here; but other multi-state bridge structures composed of switches, diodes or other means can also be used. Similarly, for Bridge B, although specific examples are illustrated here, more generally other means composed of switches, diodes or other circuit elements can also be used to provide either a two-state or multi-state bridge structure.

The embodiment used here for a resonant tank is an LLC structure whose components are arranged in a particular configuration, but other resonant tank or pulse width modulation (PWM) inductor structures or similar means can be used. The load can be connected either through a transformer, as in FIGS. 8A and 9A, or without isolation from a transformer or other isolation means, as in FIGS. 8B or 9B. As discussed with respect to FIGS. 8B or 9B, the load can be resistive, a combination of a resistive load and rectifiers, or other load types.

Figure 11:
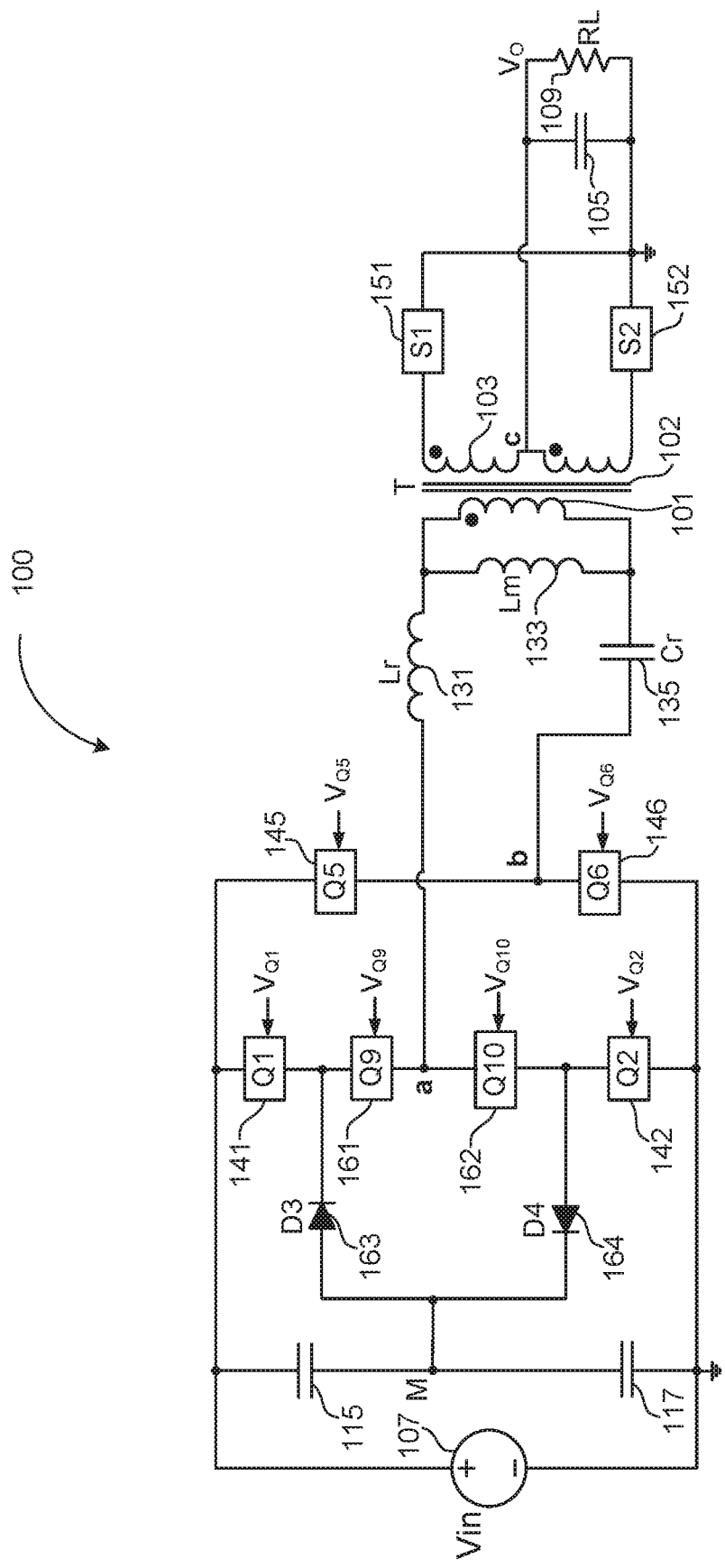
Figure 12:
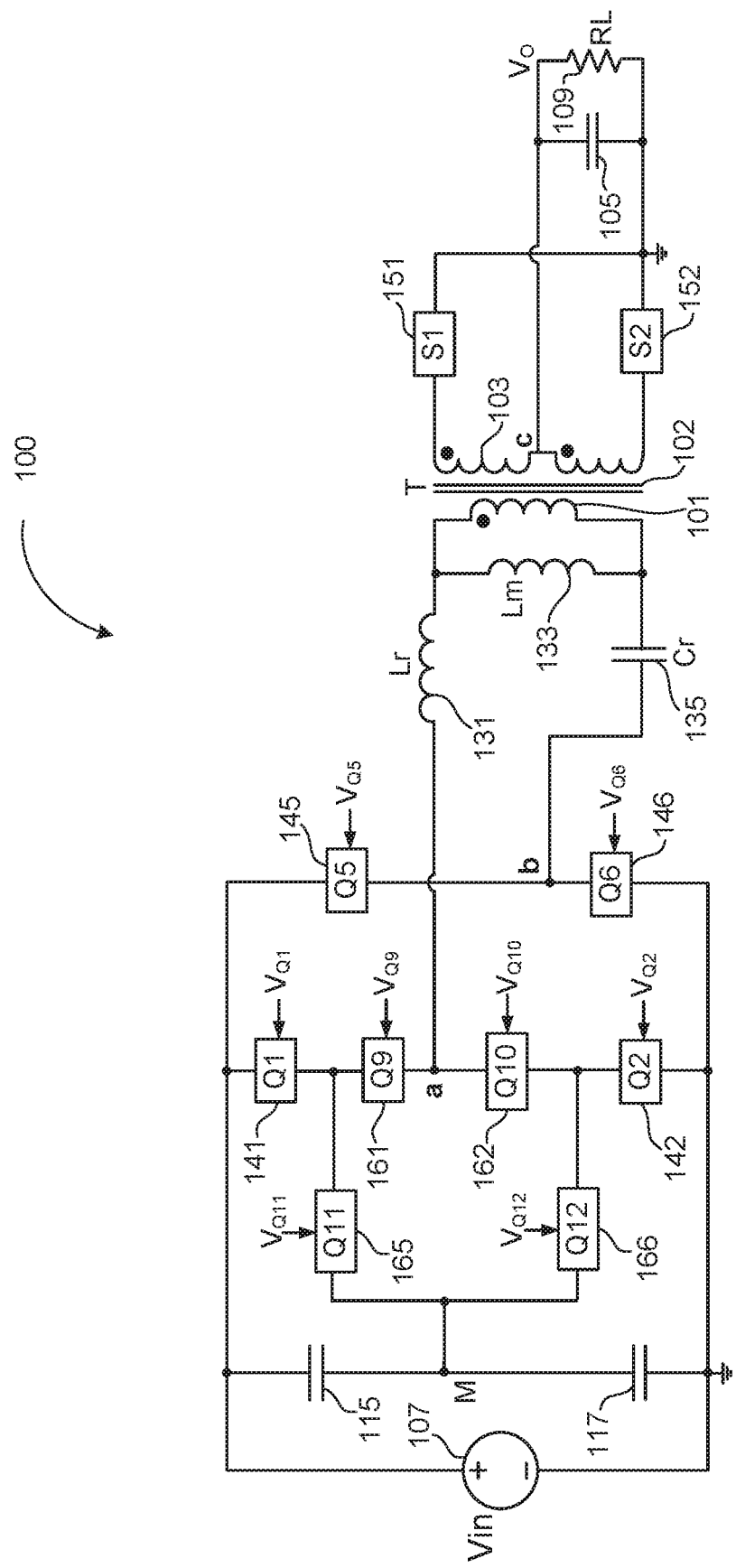

In FIGS. 8A and 9A, the output section 809 can use a secondary coil with a center tap c and a pair of diode or switches S1 151 and S2 152 as shown in FIG. 2B, but other forms and arrangements of secondary coils, switches, diodes or other means can be used to drive the load on the output side. FIGS. 11 and 12 are alternate embodiments using extended topologies, again in a hybrid arrangement providing a two-state wave form on node b and a multi-state waveform on node a, but with alternate structures for Bridge A 801.

FIGS. 11 and 12 present embodiments similar to that of FIG. 2B, but are extended embodiments with variations on the bridge providing the waveform on node a. The variation of FIG. 11 repeats many of the elements of FIG. 2B, but uses a neutral point clamping for the connection for node a. More specifically, in FIG. 11 switches Q5 145, Q6 146, the LLC resonant tank (Lr 131, Lm 133 and Cr 135), transformer T 102, and the switches S1 151, S2 152 and the other elements on the secondary side where the load is connected are all as in FIG. 2B. Node a is now connected to Vin through the series connected switches Q1 141 and Q9 161, where the node between these two switches is connected to the intermediate voltage node though the diode D3 163, which is oriented to allow current to flow from the intermediate voltage node. On the other side, node a is also now connected to ground through the series connected switches Q2 142 and Q10 162, where the node between these two switches is connected to the intermediate voltage node though the diode D4 164 which is oriented to allow current to flow to the intermediate voltage node. Relative to FIG. 2B's switches Q1 141 and Q2 142, in FIG. 11 MOSFETs with a lower voltage rating can be used for switches Q1 141, Q2 142, Q9 161 and Q10 162 as the voltage drop between node a and the supply level is now across a pair of switches in both directions. The control signals for Q9 161 and Q10 162 are represented at $V_{Q9}$ and $V_{Q10}$.

In FIG. 11, the use of the diodes D3 163 and D4 164 can leave the node between Q1 141 and Q9 161 on the one side of node a, and the node between Q2 142 and Q10 162 on the other side of node a, to float. The embodiment FIG. 12 has a similar topology to FIG. 11, but with the diodes D3 163 and D4 164 respectively replaced by the switches Q11 165 and Q12 166 that are controlled with respective control signals $V_{Q11}$ and $V_{Q12}$. This allows for more control of the voltage level on the node between Q1 141 and Q9 161 and on the node between Q2 142 and Q10 162, as the switches Q11 165 and Q12 166 respectively allow these nodes to be clamped to the level on the intermediate voltage node M. The switches Q11 165 and Q12 166 can be implemented as MOSFETs. Although FIGS. 11 and 12 are again described for a hybrid arrangement of a three-level waveform on node a and a two-level waveform on node b, either of the corresponding bridge structures can use waveforms of having higher numbers of levels.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions executed by the control circuit elements. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A circuit configured to drive a load, comprising:
   an input voltage node configured to receive an input voltage;
   a first bridge circuit connected to the input voltage node and a ground node, and configured to provide a first waveform to a first internal node, comprising:
      a first switch connected between the first internal node and the input voltage node; and
      a second switch connected between the first internal node and the ground node;
   a second bridge circuit connected to the input voltage node, an intermediate voltage node and the ground node, and configured to provide a second waveform to a second internal node, the second waveform being a multi-state waveform, the second bridge circuit comprising:
      a third switch connected between the second internal node and the input voltage node:
      a fourth switch connected between the second internal node and the ground node; and
      an intermediate voltage switch connected between the intermediate voltage node and the second internal node; and
   an intermediate circuit including a first inductor connected between the first internal node and the second internal node,
   wherein the circuit configured to drive the load is configured to drive the load between the first internal node and the second internal node with the first and second waveforms without isolation through the first inductor, and wherein the intermediate voltage switch comprises
      a fifth switch and a sixth switch connected in series between the intermediate voltage node and the second internal node.

2. The circuit of claim 1, wherein the intermediate circuit is a resonant tank.

3. The circuit of claim 2, wherein resonant tank comprises:
   the first inductor, a second inductor and a first capacitor connected in series between the first internal node and the second internal node.

4. The circuit of claim 1, further comprising:
   a control circuit connected to the first bridge circuit and the second bridge circuit and configured to supply thereto a set of control signals having a cycle of a first frequency, wherein the control circuit is configured to supply a set of control signals whereby the first bridge circuit generates the first waveform to have the first frequency and to have at least a high value and a low value, whereby the second bridge circuit generates the second waveform to have the first frequency and to have at least a high value, an intermediate value and a low value, and wherein the first and second internal nodes are not concurrently at either of the corresponding high values or the corresponding low values.

5. The circuit of claim 4, wherein control circuit is configured to provide to the second bridge circuit control signals having an adjustable duty cycle, and wherein control circuit is further configured to regulate the value of the waveforms driving the load by varying a duration of the duty cycle while maintaining the first frequency.

6. The circuit of claim 1, wherein the first waveform is a multi-state waveform.

7. A circuit configured to drive a load, comprising:
   an input voltage node configured to receive an input voltage;
   a first bridge circuit connected to the input voltage node and a ground node, and configured to provide a first waveform to a first internal node, comprising:
      a first switch connected between the first internal node and the input voltage node; and
      a second switch connected between the first internal node and the ground node;
   a second bridge circuit connected to the input voltage node, an intermediate voltage node and the ground node, and configured to provide a second waveform to a second internal node, the second waveform being a multi-state waveform, the second bridge circuit comprising:
      a third switch connected between the second internal node and the input voltage node;
      a fourth switch connected between the second internal node and the ground node; and
      an intermediate voltage switch connected between the intermediate voltage node and the second internal node; and
   an intermediate circuit including a first inductor connected between the first internal node and the second internal node,
   wherein the circuit configured to drive the load is configured to drive the load between the first internal node and the second internal node with the first and second waveforms without isolation through the first inductor, and
   wherein the intermediate voltage switch comprises:
      a fifth switch through which the third switch is connected to the second internal node through a third internal node;

a sixth switch through which the fourth switch is connected to the second internal node through a fourth internal node;

a first circuit element connected between the third internal node and the intermediate voltage node and configured to allow current to flow from the intermediate voltage node to the third internal node; and a second circuit element connected between the fourth internal node the intermediate voltage node and configured to allow current to flow from the fourth internal node to the intermediate voltage node.

8. The circuit of claim 7, wherein:

the first circuit element connected between the third internal node and the intermediate voltage node is a first diode; and the second circuit element connected between the fourth internal node the intermediate voltage node is a second diode.

9. The circuit of claim 7, wherein:

the first circuit element connected between the third internal node and the intermediate voltage node is a seventh switch; and the second circuit element connected between the fourth internal node the intermediate voltage node is an eighth switch.

10. The circuit of claim 7, wherein the intermediate circuit is a resonant tank.

11. The circuit of claim 10, wherein resonant tank comprises:

the first inductor, a second inductor and a first capacitor connected in series between the first internal node and the second internal node.

12. The circuit of claim 7, further comprising:

a control circuit connected to the first bridge circuit and the second bridge circuit and configured to supply thereto a set of control signals having a cycle of a first frequency, wherein the control circuit is configured to supply a set of control signals whereby the first bridge circuit generates the first waveform to have the first frequency and to have at least a high value and a low value, whereby the second bridge circuit generates the second waveform to have the first frequency and to have at least a high value, an intermediate value and a low value, and wherein the first and second internal nodes are not concurrently at either of the corresponding high values or the corresponding low values.

13. The circuit of claim 12, wherein control circuit is configured to provide to the second bridge circuit control signals having an adjustable duty cycle, and wherein control circuit is further configured to regulate the value of the waveforms driving the load by varying a duration of the duty cycle while maintaining the first frequency.

14. The circuit claim 7, wherein the first waveform is a multi-state waveform.

15. A method of driving a load, comprising:

receiving an input voltage;

generating a first waveform from the input voltage;

generating a second waveform from the input voltage;

receiving the first waveform and the second waveform at a first node and a second node, respectively, of a driver circuit comprising a resonant tank connected between the first node and the second node; and driving the load between the first node and the second node with the first and second waveforms without isolation through the resonant tank, wherein the first waveform has a cycle of a first frequency with a high value in a second part of the cycle and a low value in a first part of the cycle, and wherein the second waveform is a multi-level waveform of the first frequency with the high value for a first portion of the first part of the cycle and an intermediate value for a second portion of the first part of the cycle, and with the low value for a first portion of the second part of the cycle and the intermediate value for a second portion of the second part of the cycle, the intermediate value being between the high value and the low value, and wherein generating the second waveform comprises:

receiving first, second, third and fourth control waveforms at first, second, third, and fourth switches, respectively, wherein the first switch is connected between the input voltage and the second node, the second switch is connected between ground and the second node, and the third and fourth switches are connected in series between the second node and an intermediate node configured to supply the intermediate value.

16. The method of claim 15, wherein the first portion of the part of the cycle is of substantially the same duration as the first portion of the second part of the cycle.

17. The method of claim 15, further comprising:

regulating the second waveform by varying a duration of the first portion of one or both of the first part of the cycle or the second part of the cycle while maintaining the first frequency.

18. The method of claim 15, wherein the first and third control waveforms are non-overlapping, the first control waveform being high during the first portion of the second part of the cycle, and wherein the second and fourth control waveforms are non-overlapping, the second control waveform being high during the first portion of the first part of the cycle.

19. The method of claim 15, wherein the first and second control waveforms have substantially equal duty cycles, the method further comprising:

regulating the second waveform, the regulating including varying durations of the duty cycles of the first and second control waveforms while maintaining the first frequency.

* * * * *